United States Patent
Enea et al.

(10) Patent No.: US 7,003,229 B2
(45) Date of Patent: Feb. 21, 2006

(54) METHOD FOR OPTIMIZING THE SEQUENCE OF PASSIVE FILTER CONFIGURATION IN OPTICAL MUX/DEMUX DEVICES FOR WAVELENGTH DIVISION MULTIPLEX TRANSMISSION SYSTEMS AND OPTICAL PASSIVE FILTER SYSTEM OBTAINED WITH THAT METHOD

(75) Inventors: Stefano Enea, Milan (IT); Alessandro Iachelini, Erba (IT)

(73) Assignee: Alcatel, Paris (FR)

( * ) Notice: Subject to any disclaimer, the term of this patent is extended or adjusted under 35 U.S.C. 154(b) by 147 days.

(21) Appl. No.: 10/689,595

(22) Filed: Oct. 22, 2003

(65) Prior Publication Data

US 2004/0190821 A1  Sep. 30, 2004

(30) Foreign Application Priority Data

Mar. 28, 2003  (EP) .................................. 03290789

(51) Int. Cl.
*H04J 14/02* (2006.01)

(52) U.S. Cl. ............................ 398/85; 398/43; 398/79; 398/82; 398/83; 385/24

(58) Field of Classification Search ............ 398/68–73, 398/79, 83, 85, 89; 385/24, 147
See application file for complete search history.

(56) References Cited

U.S. PATENT DOCUMENTS 6,519,384 B1 * 2/2003 Persson ........................ 385/24
2002/0071156 A1 * 6/2002 Tervonen et al. ............ 359/127

FOREIGN PATENT DOCUMENTS

EP  1 109 341 A  6/2001
EP  1 109 342 A  6/2001

OTHER PUBLICATIONS

ITU-T G.694.2 dated Jun. 2002—Series G: Transmission Systems and Media, Digital Systems and Networks—Spectral grids for WDM applications: CWDM wavelength grid.
ITU-T G.652 dated Mar. 2003—Series G: Transmission Systems and Media, Digital Systems and Networks—Characteristics of a single-mode optical fibre and cable.

* cited by examiner

*Primary Examiner*—Brian Healy
*Assistant Examiner*—Derek L. Dupuis
(74) *Attorney, Agent, or Firm*—Sughrue Mion, PLLC

(57) ABSTRACT

The present invention provides for a method for optimizing the sequence of passive filter configuration in optical mux/demux devices for Wavelength Division Multiplex transmission systems and optical passive filter system obtained with that method, in which the optimization is obtained by taking care of the attenuation profile of the transmission optical fiber, and the variations of the spectral loss profile. The optimizing method permits to select the filter sequence maximizing the minimum span length of the network.

11 Claims, 2 Drawing Sheets

METHOD FOR OPTIMIZING THE SEQUENCE OF PASSIVE FILTER CONFIGURATION IN OPTICAL MUX/DEMUX DEVICES FOR WAVELENGTH DIVISION MULTIPLEX TRANSMISSION SYSTEMS AND OPTICAL PASSIVE FILTER SYSTEM OBTAINED WITH THAT METHOD

Method for optimizing the sequence of passive filter configuration in optical mux/demux devices for Wavelength Division Multiplex transmission systems and optical passive filter system obtained with that method.

TECHNICAL FIELD

The present invention relates to a Method for optimizing the sequence of passive filter configuration in optical mux/demux devices for Wavelength Division Multiplex transmission systems and optical passive filter system obtained with that method.

This application is based on, and claims the benefit of, European Patent Application No. 03290789.1 filed on Mar. 28, 2003 which is incorporated by reference herein.

BACKGROUND OF THE INVENTION

In fiber optics communications, Coarse Wavelength Division Multiplex CWDM transmission standard has been defined to achieve low cost performances in metro networks.

The ITU-T G694.2 standard defines a grid for CWDM systems consisting in 20 nm spaced signals from 1270 nm wavelength on. In those applications the span lengths are limited principally by the fiber losses, the attenuation profile of which meets the absorption OH— peak around 1390 nm (about 3 dB/km). Even at few channels below or above the two attenuation minima at 1310 nm and 1550 nm, the system performances are deteriorated.

For those reasons the span length of a CWDM (or more generally WDM) system may be limited by the channel having the worst insertion loss. The existing implementation approach of CWDM is derived from the general WDM communication technique developed in the erbium optical amplifier band (typically 1530–1565 nm), that is a symmetical structure for the tap order of mux and demux optics, normally of the pass-band thin-film 3-port passive optical filter type, where the tap order of mux and demux are inverted.

The known solution takes care of maintaining the S/N ratio as high as possible in the optical amplifiers chain. This target can't be maintained in a CWDM network for many reasons.

SUMMARY OF THE INVENTION

Starting from the above problems faced in CWDM systems using a symmetical structure for the tap order of mux and demux optics, made of pass-band thin-film 3-port passive optical filters, a more general problem to be solved is how to optimize the span length and how to avoid the above limitations in WDM systems using passive optical filters for the mux/demux optics.

To solve the above problems the present invention provides for a method for optimizing the order sequence of optical passive filters in WDM (Wavelength Division Multiplex) multi-channel transmission systems, said optical passive filters making up mux/demux structures at nodes of the WDM system, wherein the sequence order of the optical passive filters is determined depending on the attenuation profile and variations of the insertion loss profile of the WDM system, in order to maximise the minimum span length between nodes.

A further object of the present invention is to provide an optical passive filter system obtained with that method.

The basic idea of the present invention is an optimizing approach to the definition of the passive optics devices used in WDM networks, in terms of the optimum sequence used to inter-connect the 3 port filters that make up the demux and mux modules.

The idea comes from the concept of taking care of the attenuation profile of the fiber. By taking care of the variations of the spectral loss profile (above the channels used in the transmission), the optimizing method permits to select the filter sequence that maximize the minimum span length of the network.

In a preferred embodiment the idea applies to the case of a CWDM system, the previous art of whichuses symmetrical structures for the tap order of mux and demux optics, made of pass-band thin-film 3-port passive optical filters.

These and further objects are achieved by means of a method and relating device as described in the attached claims, which are considered an integral part of the present description.

The advantages achieved by the present invention consist mainly in the fact that the WDM network performances improve in terms of the distance between the stations. This is obtained without any cost increase. In addition this concept is applicable in whichever kind of network, i.e. in a point to point n-channels communication, with or without m-node OADM system.

BRIEF DESCRIPTION OF THE DRAWINGS

The invention will become fully clear from the following detailed description, given by way of a mere exemplifying and non limiting example, to be read with reference to the attached drawing figures, wherein.

BEST MODE FOR CARRYING OUT THE INVENTION

Figure 1:
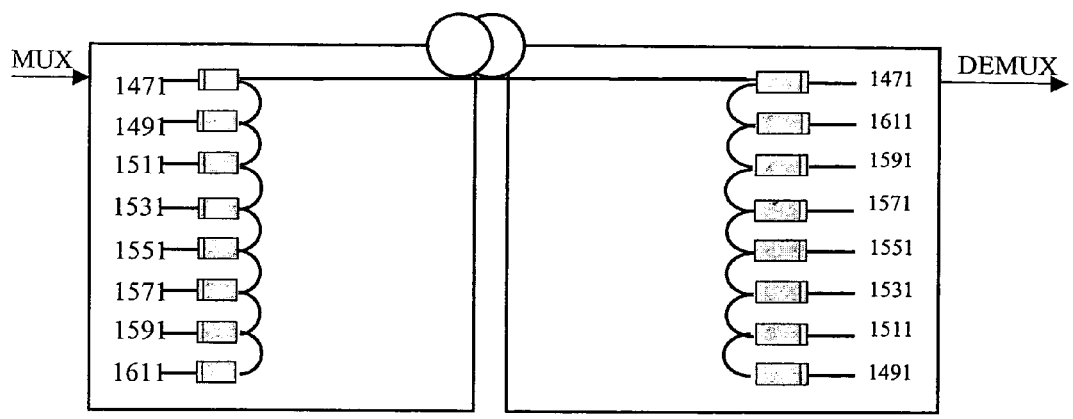
FIG. 1 shows an example of a structure for a couple of mux and demux optics, built on two sequencies of pass-band thin-film 3-port passive optical filters, to be used in a CWDM system, acording to an embodiment example of the invention.

With reference to FIG. 1, the invention will be described in the specific non limiting example of a CWDM system using two chains structures for the tap order of mux and demux optics, made of pass-band thin-film 3-port passive optical filters.

At the MUX input side there is a cascade of filters, each having an input at a given wavelength, another input coming from the other below filters and an output towards the upper filters. The composite output of the MUX goes into the transmission optical fibre.

At the DEMUX output side there is another cascade of filters, each having an output at a given wavelength, an output to the other below filters and an input from the upper filters. The composite input of the DEMUX comes from the transmission optical fibre.

The tap order of the cascades of filters is determined according to the invention.

First it's important to analize the attenuation profile over the channels of the given CWDM system. Then it's possible to define a model for the insertion loss of the different channels that comes from the 3 port technology that's going to be adopted.

A simulation of the performance will show the maximum distance for each channel at the different lambdas used by the network.

This could be repeated for a multi-node configuration system too.

The optimizing procedure defines the proper tap order of mux and demux optics that will achieve the best uniformity of the maximum distance in the window around the adopted channels in the system.

Figure 3:
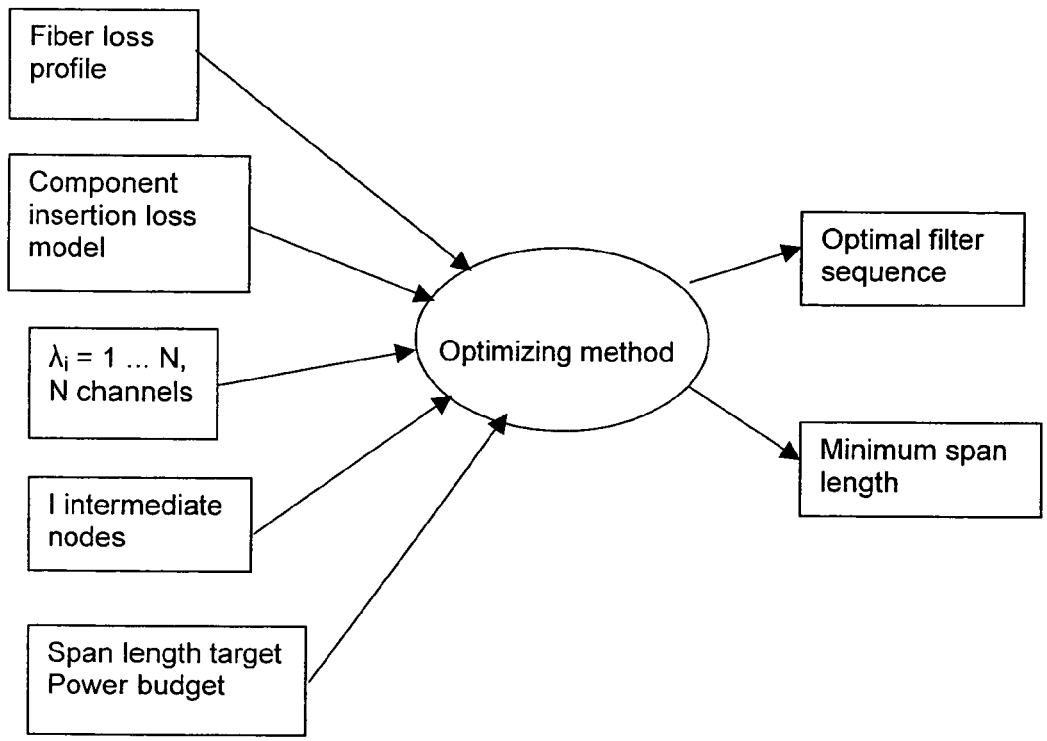
FIG. 3 shows a block diagram of the optimization method according to the invention.

In the following the method for optimizing the order sequence of optical passive filters in both mux and demux "side" is described in details, also with reference to FIG. 3.

Figure 4:
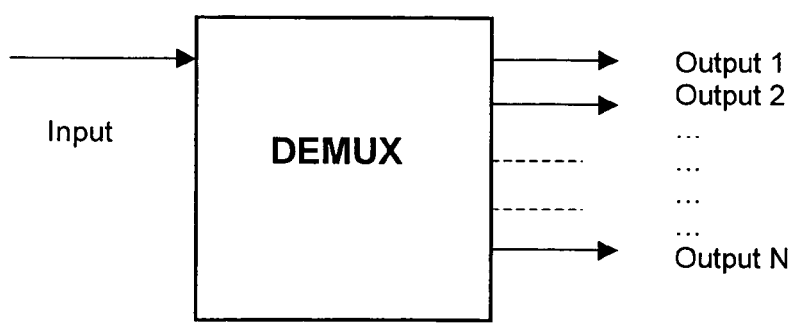
FIG. 4 shows a shematic diagram of the DEMUX side of the structure.

The input data and parameters to be used in the procedure are the following:

Number of channels: N how many physical carriers (i.e. laser wavelenghts) are used;
Set of wavelengths: $\lambda_1 \ldots \lambda_N$ [nm]

the wavelenghts of the N carriers of the WDM system (typically following a given transmission grid);
Fiber loss profile: $F_{loss}(\lambda)$ [dB/km]
the loss profile curve; it depends on the typical value for the fiber used in the system, taking care of the junctions and the age effects;
Component insertion loss model: $I_{loss1}$, $\Delta_{att}$ [dB]

they constitute the component model and represent the behaviour of a serial add/drop sequence of wavelengths. The FIG. 4 shows the case of a demux; for a mux the same insertion loss applies, but with inputs and outputs inverted.

The $I_{loss}$ value gives the losses measured between the input (common) port and the N outputs:

$$I_{loss}(n)=I_{loss1}+\Delta_{att}(n-1)$$

where $I_{loss1}$ is the insertion loss of the first port of the device; $\Delta_{att}$ is the incremental attenuation between two adjacent ports; n is the port position;
Span length target: Slt [km]

the span-length required for the communication system, it should be considered as the starting value for the optimization method;
Power Budget: Pb [dB]

the optical link power budget used for the data communication; it must be computed considering the minimum output power (end of life) of the transmitting laser, the worse receiver sensitivity, the optical path penalty and eventually other system power margin;
Intermediate nodes: Inodes a flexible CWDM network uses both the mux/demuxes and the OADM (optical add drop multiplexing) functions in the intermediate stations; in a completely passive solution, e.g. typical for CWDM, this fact requires to take care of the multiple losses in the nodes between the transmitter and the receiver: Inodes is the maximum number of foreseen intermediate non regenerative (without optical and/or electrical amplification) points of add and drop.

With those input data, we can get the Channel attenuation shape.

Substituting each wavelength of the lambda vector $\lambda_1 \ldots \lambda_N$ in the attenuation profile $F_{loss}(\lambda)$, we get the specific attenuation coefficient for each channel of the system $Ac_1 \ldots Ac_N$ [db/km]:

$$Ac_1 \ldots Ac_N = F_{loss}(\lambda_1 \ldots \lambda_N) \text{ [dB]}$$

Multiplying the $Ac_1 \ldots Ac_N$ vector for the span length target, Slt, we get the fiber attenuation vector $Fatt(\lambda_1) \ldots Fatt(\lambda_N)$:

$$Fatt(\lambda_1) \ldots Fatt(\lambda_N) = Slt^*Ac_1 \ldots Ac_N \text{ [dB]}$$

Now let's determine first the maximum attenuation of the vector:

$$Mav = \max [Fatt(\lambda_1) \ldots Fatt(\lambda_N)] \text{ [dB]}$$

Then "normalize" the vector with the subtraction:

$$Att(\lambda_i) = Mav - Fatt(\lambda_i) \text{ [dB]}$$

By ordering from zero to the highest value of attenuation, we get a vector with non-negative increasing values, describing the shaping of the different attenuations of the fiber:

$$A_1 \ldots A_N = \text{order } [Att(\lambda_1) \ldots Att(\lambda_N)] \text{ [dB]}$$

Applying the ordering by attenuation values, we also get another Lambda vector $\lambda o_1 \ldots \lambda o_N$[nm], that contains the various wavelengths with a generally non-ordered sequence.

With the above calculations, now it is possible to get the Sequence of channels inside the mux/demux.

First creating the vector Diff, which considers the difference between two adjacent elements of A vector:

$$Diff_i = A_{i+1} - A_i \text{ [dB], with } i=1 \ldots N-1$$

Then ordering (increasing) and reducing the elements of Diff to a set of different values of attenuation (each value within a given tolerance), we obtain the vector:

$$D_1 \ldots D_M \text{ [dB], with } M \leq N-1.$$

Each value of D will determine a mux/demux structure having a subgroup of channels, with the rules explained below. Then the best structure will be selected.

A "computer programming" way is adopted to describe the whole process
FOR i=1 to M;
  (this is the external cycle that leads to the M structures)
    FOR j=1 to N-1;
    (the internal cycle analyzes the attenuation sequence and creates some sub-groups of channels)
    IF $[(A_{j+1}-A_j) \leq D(i)]$ (a comparison between two attenuation [dB])
    THEN
      GROUP the channel j+1 with the channel j in the $\lambda o$ vector.
    ELSE
      Don't GROUP the j+1 channel with the previous one(s), it will be the first element of a new group.
    END FOR
END FOR With the subgroups created it is now possible to build the mux-demux tap order sequence (structure).

Each subgroup will define an inverted mux/demux order of add/drop channels.

E.g. if with 5 channels the upper step has created two subgroups: 123–45, the mux sequence will be 12345, and demux sequence will be 32154 (two groups=two inversions).

With three subgroups 1–23–45, mux will be 12345 and demux 13254.

Another simple fixed structure has to be always considered, together with those (M) obtained by the previous steps, for the next evaluations. It is the structure realized by the same order sequence of channels side mux and demux (mux and demux are the same component), which order sequence is the already obtained ordered Lambda vector $\lambda o_1 \ldots \lambda o_N$ [nm].

After having defined the subgroups of wavelengths (channels), we must compute the Insertion loss I.L. for the whole chain of mux/demuxes, to get the wanted span length, for different values of intermediate nodes Inodes from zero to the maximum.

In case of no intermediate nodes, the I.L. are dictated by a couple of devices composed by a mux and a demux. With one intermediate node we consider the attenuation for a channel in a loop mode (the drop channel is re-inserted in the corresponding add port), implemented with the same structure as the transmitting and receiving stations. This means that the I.L. has been computed with two couples of devices.

Each subgroup has a couple of numbers, Pinf, Psup, corresponding to the positions of the first and the last elements. Pinf and Psup are between 1 and N.

For each channel of a subgroup, the I.L. is computed with the expression:

$$\lambda loss = I_{loss}(Pinf) + I_{loss}(Psup) \text{ [dB]}$$

If a channel is "ungrouped" (alone) its position in the mux and demux structure is the same, so Pinf=Psup=Psingle and the I.L. will be:

$$\lambda loss = 2 * I_{loss}(Psingle) \text{ [dB]}$$

For any number of intermediate nodes, Inodes, the total I.L. per channel will be:

$$\lambda loss * (Inodes+1) \text{ [dB]}$$

Therefore for each channel $$\text{Span length} (\lambda) = [Pb - \lambda loss * (Inodes+1)]/Ac(\lambda) \text{ [km]}$$

The span length, related to the structures obtained, will be the minimum of Span length ($\lambda$).

$$\text{Span length} = \min [\text{Span length}(\lambda_1 \ldots \lambda_N)] \text{ [km]}$$

The normal condition in which the optimization method will give an improved situation with benefits with respect to the known standard filter disposition, is when the value of Max[Att] is comparable with $\Delta_{att}*(N-1)$ Instead The optimization method faces two particular conditions:

In case Max[Att]$\gg\Delta_{att}*(N-1)$, whatever mux/demux structure can't modify the attenuation channel profile. It's suggested to keep the any passive optics structure that could give the maximum building benefits.

In case $\Delta_{att}*(N-1) \gg$ Max[Att], the mux/demux losses are more determinant than the medium attenuation profile (vector Fatt($\lambda_1$) ... Fatt($\lambda_N$) ), there's no way to equalize the channel. If this happens it's suggested to adopt the standard solution with the inverted tap order for the couple of mux and demux, this "complementary" structure has a constant overall insertion loss over the set of channels.

Figure 2:
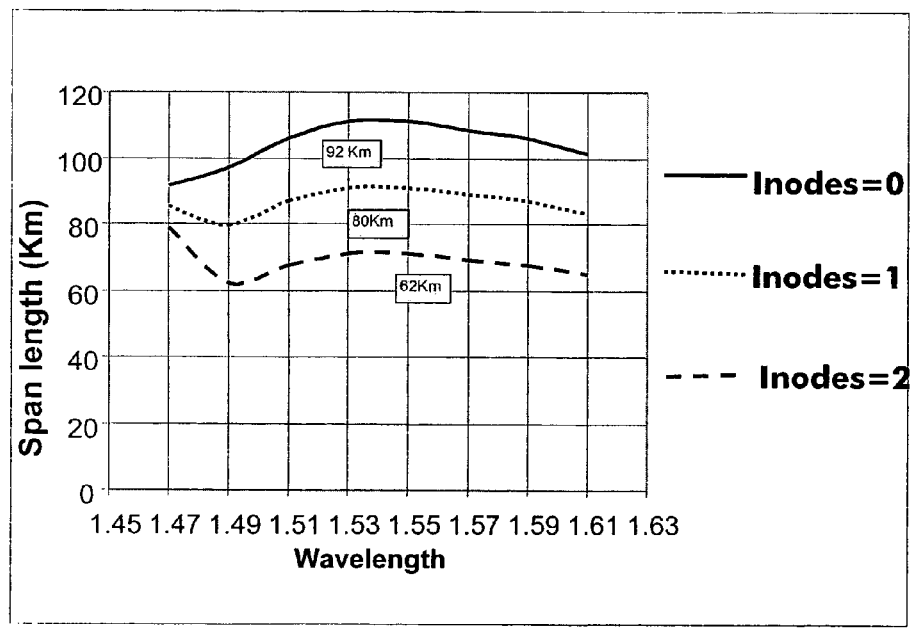
FIG. 2 shows schematic diagrams of the trend of the Span Length vs. wavelength, with different numbers of intermediate nodes obtained applying the optimized filter structure of FIG. 1.

An embodiment example is shown in FIGS. 1 and 2.

An 8-channel 2.5 Gbit/s system is considered, with CWDM transmission defined in ITU-T G694.2 standard as consisting of a multi-wavelenght transmission on a grid of 20 nm spaced signals from 1471 to 1611 nm wavelength, with the use of standard optical fiber span, as defined in ITU-T G652, and state of the art mux/demux thin-film filters.

By applying the optimization method of the invention, we get a gain in terms of span length up to 20 km with number of intermediate nodes Inodes=2 in an OADM path with respect to the standard filter sequence (simple inversion or "complementary" structure), without adding cost to any of the system components. As shown in FIG. 1, the MUX input filter sequence is normally ordered with increasing wavelength values. The DEMUX output filter sequence is made of two subgroups, the first with one element (1471) the second with the others ordered in opposite sequence with respect to the MUX one (from 1491 to 1611).

Further implementation details will not be described, as the man skilled in the art is able to carry out the invention starting from the teaching of the above description.

In particular the invention can be applied in a general situation of optimizing the span length of a WDM system using passive optical filters of other types for the mux/demux optics The present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

What is claimed is:

1. A method for optimizing the sequence order of optical passive filters in WDM (Wavelength Division Multiplex) multi-channel transmission systems, said optical passive filters making up mux/demux structures at nodes of the WDM system, the method comprising:
   setting a number of parameters identifying the WDM system;
   defining the attenuation profile over different channels of the WDM system, by using said parameters;
   determining an order sequence of the different channels in a mux/demux structure from the attenuation profile;
   determining an insertion loss profile of the different channels from the order sequence;
   determining a minimum span length between nodes resulting from applying said order sequence;
   wherein the parameters identifying the WDM system comprise:
   Number of channels: N;
   Set of wavelengths: $\lambda_1 \ldots \lambda_N$ [nm] of the N channels;
   Fiber loss profile: $F_{loss}(\lambda)$ [dB/km] of the optical fiber used in the WDM system;
   Insertion loss model: $I_{loss1}$, and $\Delta_{att}$ [dB] of the mux/demux structure, where $I_{loss}$ value gives the losses measured between the input (common) port and the N outputs: $I_{loss}(n)=I_{loss1}+\Delta_{att}(n-1)$, $I_{loss1}$ is the insertion loss of the first port of the structure; $\Delta_{att}$ is the incremental attenuation between to adjacent ports of the structure; n is the port position;

Span length target: Slt [km] as required for the WDM system;

Power Budget: Pb [dB] used between the nodes of the WDM system;

Intermediate nodes: Inodes, maximum number of intermediate non-regenerative nodes.

2. The method according to claim 1, wherein the sequence order of the optical passive filters is determined depending on the attenuation profile and variations of the insertion loss profile of the WDM system, in order to maximize the minimum span length between nodes.

3. The method according to claim 1, wherein the step of determining the insertion loss profile of the different channels from that sequence is made for different numbers of intermediate non-regenerative nodes, from no nodes to a given maximum.

4. The method according to claim 1, wherein the step of defining the attenuation profile over the channels of the WDM system, comprises:

substituting each wavelength of the vector $\lambda_1 \ldots \lambda_N$ in the attenuation profile $F_{loss}(\lambda)$;

determining the specific attenuation coefficient vector for each channel of the system $Ac_1 \ldots Ac_N$ [db/km]=$F_{loss}(\lambda_1 \ldots \lambda_N)$ [dB];

multiplying the $Ac_1 \ldots Ac_N$ vector for the span length target Slt to determine the fiber attenuation vector $Fatt(\lambda_1) \ldots Fatt(\lambda_N)=Slt*Ac_1 \ldots Ac_N$ [dB];

determining the maximum attenuation of the vector Fatt $(\lambda_1) \ldots Fatt(\lambda_N)$:

$Mav=\max[Fatt(\lambda_1) \ldots Fatt(\lambda_N)]$ [dB];

normalizing the vector $Fatt(\lambda_1) \ldots Fatt(\lambda_N)$ with the subtraction:

$Att(\lambda_i)=Mav-Fatt(\lambda_i)$ [dB];

ordering from zero to the highest value of attenuation to determine a vector with non-negative increasing values, describing the shaping of the different attenuations of the fiber:

$A_1 \ldots A_N=order \ [Att(\lambda_1) \ldots Att(\lambda_N)]$ [dB];

applying the ordering by attenuation values, to determine a Lambda vector $\lambda o_1 \ldots \lambda o_N$[nm], that contains the various wavelengths with a generally non-ordered sequence.

5. The method according to claim 4, wherein the step of determining the order sequence of channels in the mux/demux from the attenuation profile comprises:

creating the vector Diff, difference between two adjacent elements of A vector: $Diff_i=A_{i+1}-A_i$ [dB], with $i=1 \ldots N-1$;

ordering and reducing the elements of Diff to a set of different values of attenuation (each value within a given tolerance), obtaining the vector:

$D_1 \ldots D_M$[dB], with $M \leq N-1$, each value of D determining a mux/demux structure having a subgroup of channels, with the following iterative calculation:

FOR i=1 to M;
FOR j=1 to N−1;
  IF $[(A_{j+1}-A_j) \leq D(i)]$
  THEN
    GROUP the channel j+1 with the channel j in the λo vector,
  ELSE
    Don't GROUP the j+1 channel with the previous one(s), it will be the first element of a new group,
END FOR
END FOR using the subgroups created to build the mux-demux filter order sequence where each subgroup defines an inverted mux/demux order of channels, each subgroup having a couple of numbers, Pinf, Psup, between 1 and N, corresponding to the positions of the first and the last element of the subgroup.

6. The method according to claim 5, wherein the step of determining the insertion loss profile I.L. of the different channels comprises:

computing, for each channel of a subgroup, the I.L. with the expression:

$\lambda loss=I_{loss}(Pinf)+I_{loss}(Psup)$ [dB];

wherein for any number of intermediate nodes, Inodes, the total I.L. per channel is: $\lambda loss *(Inodes+1)$ [dB];

for each channel the Span length (λ) is:

Span length $(\lambda)=[Pb-\lambda loss*(Inodes+1)]/Ac(\lambda)$ [km]; and the span length of the WDM system being the minimum of Span length (λ):

Span length =min [Span length$(\lambda_1 \ldots \lambda_n)$] [km].

7. A device comprising a mux/demux structure of passive optical filters for WDM (Wavelength Division Multiplex) multi-channel transmission system, wherein the mux/demux structure is obtained by:

setting a number of parameters identifying the WDM system;

defining the attenuation profile over different channels of the WDM system, by using said parameters;

determining an order sequence of the different channels in a mux/demux structure from the attenuation profile;

determining an insertion loss profile of the different channels from the order sequence;

determining a minimum span length between nodes resulting from applying said order sequence;

wherein the parameters identifying the WDM system comprise:

Number of channels: N;

Set of wavelengths: $\lambda_1 \ldots \lambda_N$ [nm] of the N channels;

Fiber loss profile: $F_{loss}(\lambda)$ [dB/km] of the optical fiber used in the WDM system;

Insertion loss model: $I_{loss1}$, and $\Delta_{att}$ [dB] of the mux/demux structure, where $I_{loss}$ value gives the losses measured between the input (common) port and the N outputs: $I_{loss}(N)=I_{loss1}+\Delta_{att(n-1)}$, $I_{loss1}$ is the insertion loss of the first port of the structure; $\Delta_{att}$ is the incremental attenuation between to adjacent ports of the structure; n is the port position;

Span length target: Slt [km] as required for the WDM system; Power Budget: Pb [dB] used between the nodes of the WDM system;

Intermediate nodes: Inodes, maximum number of intermediate non-regenerative nodes.

8. The device as in claim 7, wherein said mux/demux structure of passive optical filters is made of pass-band thin-film 3-port passive optical filters.

9. WDM (Wavelength Division Multiplex) multi-channel transmission systems comprising mux/demux structures of passive optical filters as in claim 7.

10. CWDM (Coarse Wavelength Division Multiplex) multi-channel transmission systems comprising mux/demux structures of passive optical filters as in claim 7.

11. A computer readable medium having a program recorded thereon, said computer readable medium comprising computer program code means adapted to perform method for optimizing the sequence order of optical passive filters in WDM (Wavelength Division Multiplex) multi-channel transmission systems, said optical passive filters making up mux/demux structures at nodes of the WDM system, the method comprising:

setting a number of parameters identifying the WDM system;

defining the attenuation profile over different channels of the WDM system, by using said parameters;

determining an order sequence of the different channels in a mux/demux structure from the attenuation profile;

determining an insertion loss profile of the different channels from the order sequence;

determining a minimum span length between nodes resulting from applying said order sequence;

wherein the parameters identifying the WDM system comprise:

Number of channels: N;

Set of wavelengths: $\lambda_1 \ldots \lambda_N$ [nm] of the N channels;

Fiber loss profile: $F_{loss}(\lambda)$ [dB/km] of the optical fiber used in the WDM system;

Insertion loss model: $I_{loss1}$, and $\Delta_{att}$ [dB] of the mux/demux structure, where $I_{loss}$ value gives the losses measured between the input (common) port and the N outputs: $I_{loss}(n)=I_{loss1}+\Delta_{att}(n-1)$, $I_{loss1}$ is the insertion loss of the first port of the structure; $\Delta_{att}$ is the incremental attenuation between to adjacent ports of the structure; n is the port position;

Span length target: Slt [km] as required for the WDM system;

Power Budget: Pb [dB] used between the nodes of the WDM system;

Intermediate nodes: Inodes, maximum number of intermediate non-regenerative nodes.

* * * * *